(12) United States Patent
Kim et al.

(10) Patent No.: US 12,529,902 B2
(45) Date of Patent: Jan. 20, 2026

(54) SUCTION TYPE STABILIZER FOR LENS, AND MEDICAL MICROSCOPE AND MEDICAL ENDOSCOPE INCLUDING THE SAME

(71) Applicants: THE ASAN FOUNDATION, Seoul (KR); UNIVERSITY OF ULSAN FOUNDATION FOR INDUSTRY COOPERATION, Ulsan (KR)

(72) Inventors: Jun Ki Kim, Seoul (KR); Bjorn Rolf Paulson, Seoul (KR); Bohlooli Darian Saeed, Seoul (KR)

(73) Assignees: THE ASAN FOUNDATION, Seoul (KR); UNIVERSITY OF ULSAN FOUNDATION FOR INDUSTRY COOPERATION, Ulsan (KR)

(*) Notice: Subject to any disclaimer, the term of this patent is extended or adjusted under 35 U.S.C. 154(b) by 351 days.

(21) Appl. No.: 18/306,309

(22) Filed: Apr. 25, 2023

(65) Prior Publication Data

US 2023/0258954 A1 Aug. 17, 2023

Related U.S. Application Data

(63) Continuation of application No. PCT/KR2021/019616, filed on Dec. 22, 2021.

(30) Foreign Application Priority Data

Jan. 4, 2021 (KR) .................. 10-2021-0000115

(51) Int. Cl.
*G02B 27/64* (2006.01)
*G02B 21/36* (2006.01)
*G02B 23/24* (2006.01)

(52) U.S. Cl.
CPC .......... *G02B 27/644* (2013.01); *G02B 21/362* (2013.01); *G02B 23/2476* (2013.01)

(58) Field of Classification Search
CPC . G02B 27/644; G02B 21/362; G02B 23/2476
(Continued)

(56) References Cited

U.S. PATENT DOCUMENTS

| 6,249,344 B1* | 6/2001 | Virag | G01N 15/05 356/244 |
| 2005/0272972 A1* | 12/2005 | Iddan | A61B 1/041 600/102 |

FOREIGN PATENT DOCUMENTS

| JP | 2000-500573 A | 1/2000 |
| JP | 2006-26063 A | 2/2006 |

(Continued)

OTHER PUBLICATIONS

International Search Report issued Apr. 13, 2022 in PCT/KR2021/019616 filed Dec. 22, 2021, 2 pages.
(Continued)

*Primary Examiner* — Balram T Parbadia
*Assistant Examiner* — Mitchell T Oestreich
(74) *Attorney, Agent, or Firm* — Oblon, McClelland, Maier & Neustadt, L.L.P.

(57) ABSTRACT

Disclosed is a suction type stabilizer for a lens including a probe mount, in which a lens is disposed in an interior thereof and an opening that contacts a specimen is formed on one side thereof, an elastic body interposed between the lens and the probe mount, that elastically supports the lens, and defining a division space between the lens and the opening, and a negative pressure forming part forming a negative pressure while suctioning air accommodated in the division space and attaching and fixing the specimen to the opening.

10 Claims, 13 Drawing Sheets

(58) Field of Classification Search
USPC .......................................................... 359/368
See application file for complete search history.

(56) References Cited

FOREIGN PATENT DOCUMENTS

| | | | |
|---|---|---|---|
| JP | 2014157222 A | * | 8/2014 |
| KR | 10-1725139 B1 | | 4/2017 |
| KR | 10-1782751 B1 | | 9/2017 |
| KR | 10-1892445 B1 | | 8/2018 |
| KR | 10-2019-0106355 A | | 9/2019 |

OTHER PUBLICATIONS

Korean Office Action issued Oct. 26, 2022 in Korean Application 10-2021-0000115 filed Jan. 4, 2021, (with English translation), 7 pages.

* cited by examiner

SUCTION TYPE STABILIZER FOR LENS, AND MEDICAL MICROSCOPE AND MEDICAL ENDOSCOPE INCLUDING THE SAME

CROSS-REFERENCE TO RELATED APPLICATIONS

The present application is a continuation of International Patent Application No. PCT/KR2021/019616, filed on Dec. 22, 2021, which is based upon and claims the benefit of priority to Korean Patent Application No. 10-2021-0000115 filed on Jan. 4, 2021. The disclosures of the above-listed applications are hereby incorporated by reference herein in their entirety.

BACKGROUND

Embodiments of the inventive concept described herein relate to a suction type stabilizer for a lens, and a medical microscope including the same, which may acquire an image of a high resolution from a specimen that is shaken.

Application and development of imaging (in-vivo) of living bodies for observing internal organs, cells of tissues, or small organs of cells with a high resolution have been restricted due to vibrations, such as respirations or pulses due to physiological motions or due to activities undertaken by the organism.

In particular, a super resolution image may be acquired due to recent development of a super resolution microscopy that overcomes a limit in optical diffraction, but natural motion of the tissues of living bodies has been a big obstacle to a technology for a high resolution image in an interior of a living body, and firm and stable coupling of a specimen and an imaging device is important to overcome this, but a super resolution living body imaging technology for obtaining super resolution information from a live specimen has not been developed yet.

In a super resolution imaging system of a super resolution that overcomes the limit in optical diffraction, vibrations of a specimen influence degradation of image resolution severely, and thus a measure for improving this has been required.

SUMMARY

An aspect of the inventive concept provides a suction type stabilizer for a lens, and a medical microscope and a medical endoscope including the same, which may acquire a high resolution image from a specimen as shaking or vibration of the specimen is restricted by fixing the specimen relative to the imaging system.

Another aspect of the inventive concept provides a suction type stabilizer for a lens, and a medical microscope and a medical endoscope including the same, which may acquire a cellular resolution image of a specimen and may acquire an image of a cell from an interior organ of the specimen.

The technical objects of the inventive concept are not limited to the above-mentioned ones, and the other unmentioned technical objects will become apparent to those skilled in the art from the following description.

According to an aspect of the inventive concept, a suction type stabilizer for a lens includes a probe mount, in which a lens is disposed in an interior thereof and an opening that contacts a specimen is formed on one side thereof, an elastic body interposed between the lens and the probe mount, that elastically supports the lens, and defining a division space between the lens and the opening, and a negative pressure forming part forming a negative pressure while suctioning air accommodated in the division space and attaching and fixing the specimen to the opening.

Furthermore, the suction type stabilizer may further include a press member provided in the opening and that presses tissues of the specimen, a suction hole may be formed in the press member, and the tissues of the specimen that are to be observed may be attached to the press member in a flat state when the negative pressure is formed in the division space and the suction hole by the negative pressure forming part.

Furthermore, a plurality of suction holes may be provided, and the plurality of suction holes may be arranged along a circumferential direction of the press member.

Furthermore, the probe mount may further include a working distance extending part extending from the opening toward the specimen to extend the working distance of the lens, and a communication channel communicated with the opening may be formed in the working distance extending part.

Furthermore, an outer peripheral surface of the working distance extending part may have a shape, a diameter of which gradually decreases toward the specimen.

Furthermore, the probe mount may further include a working distance extending part coupled to the opening to be separable and that extends the working distance of the lens, and a communication channel communicated with the opening may be formed in the working distance extending part.

Furthermore, the probe mount may be divided into a first mount body provided with a first bracket and a second mount body provided with a second bracket with respect to a lengthwise direction of the lens, and the probe mount may have a coupling member coupling the first bracket and the second bracket.

Furthermore, one side of the probe mount, which faces the specimen, may have a shape, a diameter of which gradually decreases toward the specimen.

Furthermore, the probe mount may further include a plurality of unit mounts connected to each other to be introduced and extracted in multiple stages along a direction, in which the working distance of the lens is adjusted.

According to another aspect of the inventive concept, a medical microscope including the suction type stabilizer for a lens may be provided According to another aspect of the inventive concept, a medical endoscope including the suction type stabilizer for a lens may be provided Detailed items of the other embodiments are included in the detailed description and the accompanying drawings.

BRIEF DESCRIPTION OF THE FIGURES

The above and other objects and features will become apparent from the following description with reference to the following figures, wherein like reference numerals refer to like parts throughout the various figures unless otherwise specified, and wherein.

DETAILED DESCRIPTION

Figure 1:
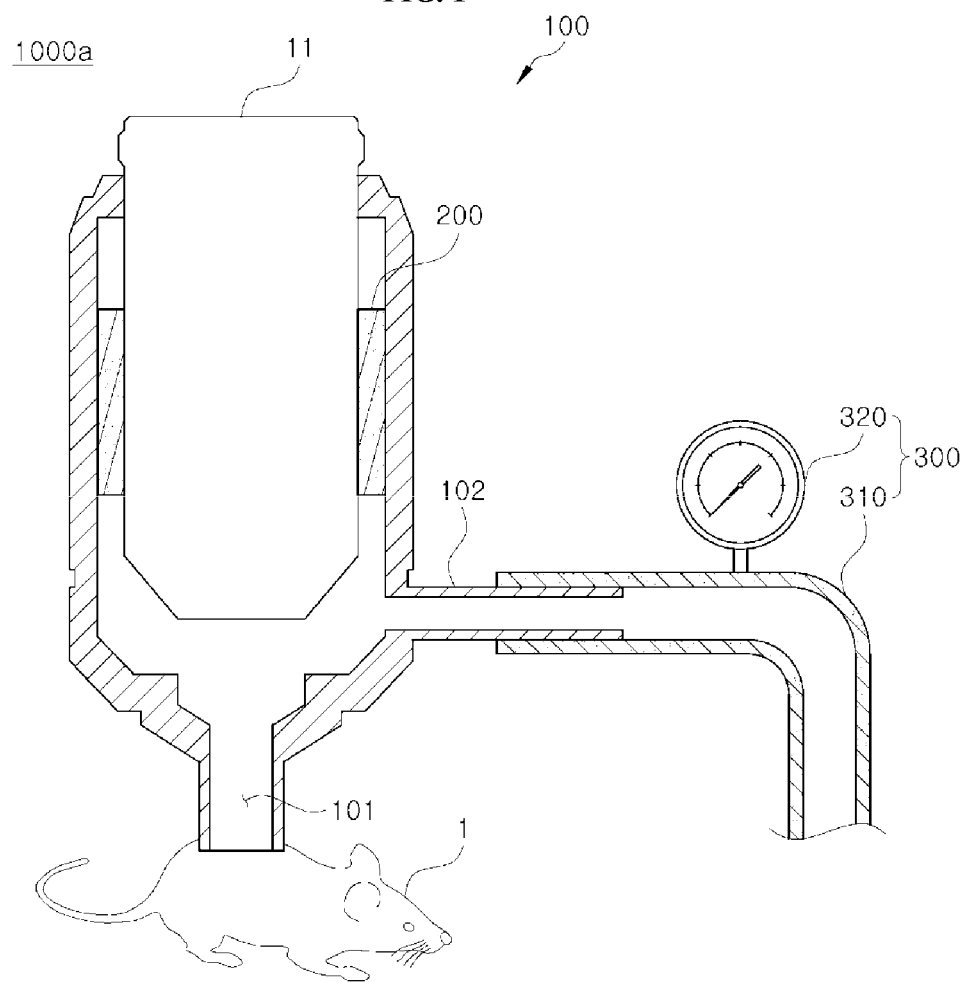
FIG. 1 is a cross-sectional view illustrating a suction type stabilizer for a lens according to a first embodiment of the inventive concept.

The above and other aspects, features, and advantages of the inventive concept will become apparent from the following description of the following embodiments given in conjunction with the accompanying drawings. However, the inventive concept is not limited by the embodiments disclosed herein but will be realized in various different forms, and the embodiments are provided only to make the disclosure of the inventive concept complete and fully inform the scope of the inventive concept to an ordinary person in the art, to which the inventive concept pertains, and the inventive concept will be defined by the scope of the claims.

The terms used herein are provided to describe the embodiments but not to limit the inventive concept. In the specification, the singular forms include plural forms unless particularly mentioned. The terms "comprises" and/or "comprising" used herein does not exclude presence or addition of one or more other components, in addition to the aforementioned components. Throughout the specification, the same reference numerals denote the same components, and "and/or" includes the respective components and all combinations of the components. Although "first", "second" and the like are used to describe various components, the components are not limited by the terms. The terms are used simply to distinguish one component from other components. Accordingly, it is apparent that a first component mentioned in the following may be a second component without departing from the spirit of the inventive concept.

Unless otherwise defined, all terms (including technical and scientific terms) used herein have the same meaning as commonly understood by those skilled in the art to which the inventive concept pertains. It will be further understood that terms, such as those defined in commonly used dictionaries, should be interpreted as having a meaning that is consistent with their meaning in the context of the specification and relevant art and should not be interpreted in an idealized or overly formal sense unless expressly so defined herein.

The terms, such as "below", "beneath", "lower", "above", and "upper", which are spatially relative may be used to easily describe a correlation between one component and other components as illustrated in the drawings. The spatially relative terms have to be understood as terms including different directions of the components during use or an operation, in addition to the direction illustrated in the drawings. For example, when the components illustrated in the drawings are overturned, the components "below" or "beneath" another component may be positioned "above" the other components. Accordingly, the term "below" or "beneath" may include "below" or "beneath" and "above". The component may be oriented in different directions, and accordingly, the spatially relative terms may be construed according to the orientation.

In the following embodiments, the components having the same configurations will be described in a first embodiment representatively by using the same reference numerals, and configurations that are different from those of the first embodiment will be described in the other embodiments.

FIG. 1 is a cross-sectional view illustrating a suction type stabilizer 1000a for a lens according to a first embodiment of the inventive concept.

As illustrated in FIG. 1, the suction type stabilizer 1000a for a lens according to the first embodiment of the inventive concept includes a probe mount 100, an elastic body 200, and a negative pressure forming part 300.

The probe mount 100 is a basic body, and a lens 11 and the elastic body 200 are received in an interior of the probe mount 100. The probe mount 100 may be manufactured through 3D printing, and may be mass-produced. Furthermore, the probe mount 100 may be formed of a plastic material.

Figure 2:
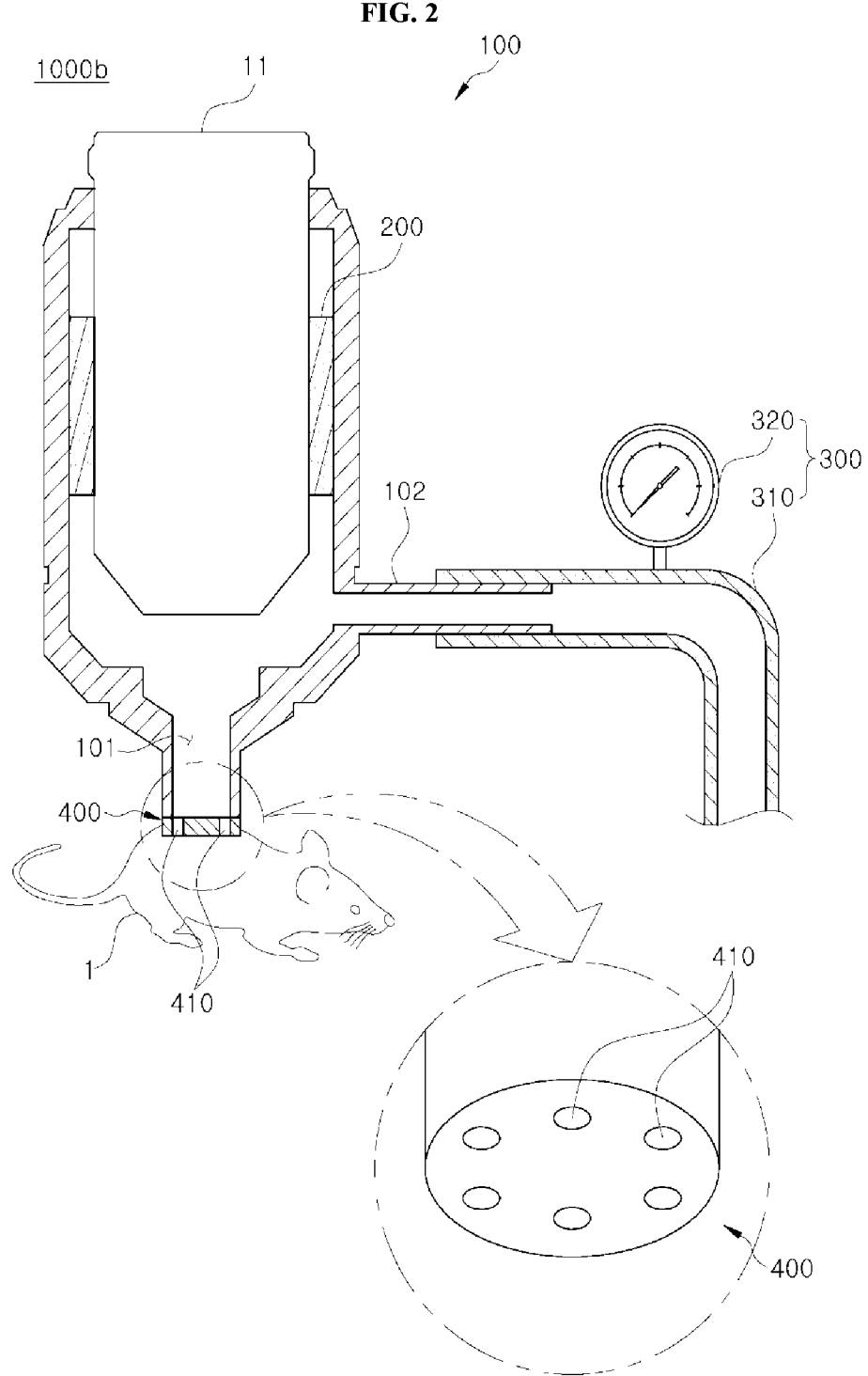
FIG. 2 is a cross-sectional view illustrating a suction type stabilizer for a lens according to a second embodiment of the inventive concept.

An opening 101 that contacts a specimen 1 is formed on one side of the probe mount 100, which faces the specimen 1. Referring to FIG. 2, the opening 101 may be formed on a lower side of the probe mount 100, but the inventive concept is not limited thereto. Accordingly, an enlarged image of tissues of the specimen 1 may be formed in the lens 11 through the opening 101 of the probe mount 100. Here, the specimen may be all objects that are alive, and for example, may human bodies, middle/large-sized animals (monkeys, pigs, dogs, rabbits, guinea pigs, and the like), small-sized animals (rats, mice, and the like), skin and organs veterinary animals (horses, pigs, dogs, cats, and the like).

The elastic body 200 is interposed between the lens 11 and the probe mount 100 and functions to elastically support the lens 11. For example, the elastic body 200 may have an annular shape. Then, an inner peripheral surface of the elastic body 200 may be attached to an outer peripheral surface of the lens 11 while being maintained in a sealed state and an outer peripheral surface of the elastic body 200 is attached to an inner peripheral surface of the probe mount 100, and thus a division space is formed between the lens 11 and the opening 101 in an interior of the probe mount 100.

The negative pressure forming part 300 may form a negative pressure in the division space of the probe mount 100 and functions to attach the tissues of the specimen 1 that contacts the opening 101 to the opening 101 due to the generated negative pressure.

For example, the negative pressure forming part 300 may include a suction tube 310 that suctions the air accommodated in the division space of the probe mount 100, and a vacuum pump (not illustrated). Here, in the probe mount 100, a communication part 102 that is communicated with the division space may protrude, and the suction tube 310 may be coupled to the communication part 102 to be communicated therewith. A pressure gauge 320 that indicates an internal pressure may be installed in the suction tube 310. Furthermore, the vacuum pump may suction the air accommodated in the division space of the probe mount 100 through the suction tube 310 to form the negative pressure in the division space and the opening 101 of the probe mount 100. Accordingly, a user may set the division space and the opening 101 of the probe mount 100 to a negative pressure state or a negative pressure release state through switching on/off of the vacuum pump.

Hereinafter, an operation example of the suction type stabilizer 1000a for a lens according to the first embodiment of the inventive concept will be described.

First, the user disposes the lens 11 in an interior of the probe mount 100. Then, the lens 11 is elastically supported by the probe mount 100 while a sealing state thereof is maintained by the elastic body 200 interposed between the probe mount 100 and the lens 11, and the division space is formed between the lens 11 and the opening 101 of the probe mount 100.

Next, the user brings the tissues of the specimen 1, which are to be observed, into contact with the opening 101 of the probe mount 100.

Next, when the user operates the negative pressure forming part 300, the negative pressure forming part 300 suctions the air accommodated in the division space to form the negative pressure in the division space and the opening 101.

In this way, because the negative pressure is formed in the opening 101, shaking of the specimen 1 is restrained as the tissues of the specimen 1 is attached and fixed to the opening 101 of the probe mount 100.

As a result, because the specimen 1 is fixed by the suction type stabilizer 1000a for a lens and shaking of the specimen 1 is restricted, a screen quality of the image of the specimen 1 that is formed in the lens 11 may be prevented from being degraded, and the user who identified the screen of the display may make an accurate diagnosis in clinics.

FIG. 2 is a cross-sectional view illustrating a suction type stabilizer 1000b for a lens according to a second embodiment of the inventive concept.

As illustrated in FIG. 2, the suction type stabilizer 1000b for a lens according to the second embodiment of the inventive concept may further include a press member 400, differently from the first embodiment of the inventive concept.

The press member 400 functions to press the tissues of the specimen 1 to the opening 101 in a flat state.

In detail, the press member 400 may be glass that surrounds the opening 101, and at least one suction hole 410 may be formed on a plate surface of the press member 400. When a negative pressure is formed, some tissues of the specimen 1, which are pressed by the press member 400 are suctions through the suction hole 410 due to the negative pressure generated in the division space, and the remaining tissues of the specimen 1 are attached to the plate surface of the press member 400 in a flat state. As a result, the lens 11 may acquire an image of the tissues of the specimen 1 not in an abnormally modified form that is suctioned in the opening 101 but in a normal flat form, and the user who identified it in the screen of the display may enhance an identification performance of lesions of the specimen 1. In particular, when a grid pattern is formed in the press member 400, the user may further enhance the identification performance of the lesions of the specimen 1.

Meanwhile, a plurality of suction holes 410 may be provided, and the plurality of suction holes 410 may be arranged on the plate surface of the press member 400 along a circumferential direction of the press member 400. Accordingly, the tissues of the specimen 1 may be suctioned into the plurality of suction holes 410 relatively strongly, and may be attached to the press member 400 in a flat state.

Meanwhile, a working distance of the lens 11 means a distance from the lens 11 to the specimen 1, and the working distance of the lens 11 becomes smaller as a magnification of the lens becomes higher and the working distance of the lens 11 becomes larger as the magnification of the lens becomes lower. Accordingly, it is preferable that the working distance of the lens 11 is adjusted according to the magnification of the lens 11. According to a suction type stabilizer 1000c for a lens according to a third embodiment of the inventive concept, a working distance of the lens 11 may be adjusted, and this will be described in detail.

Figure 3A:
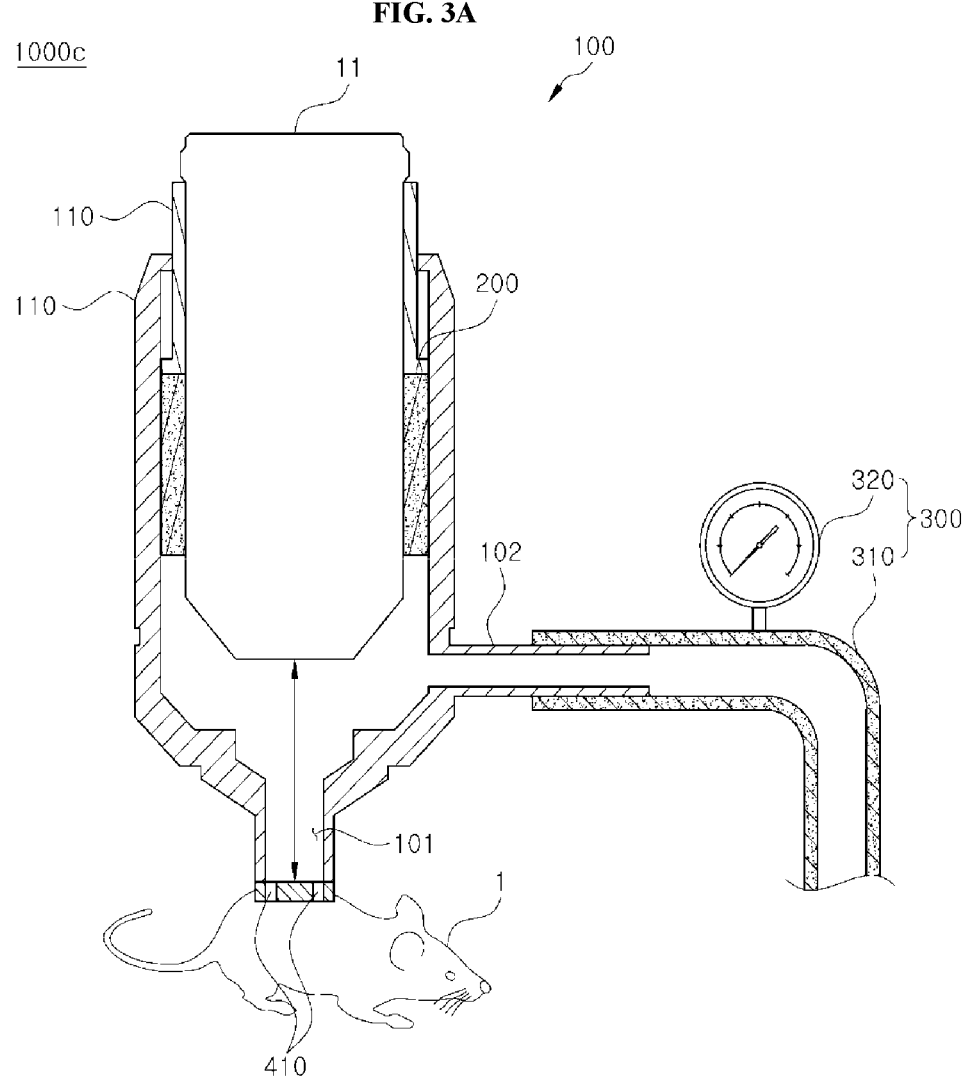
FIGS. 3A and 3B are cross-sectional views illustrating a suction type stabilizer for a lens according to a third embodiment of the inventive concept.
Figure 3B:
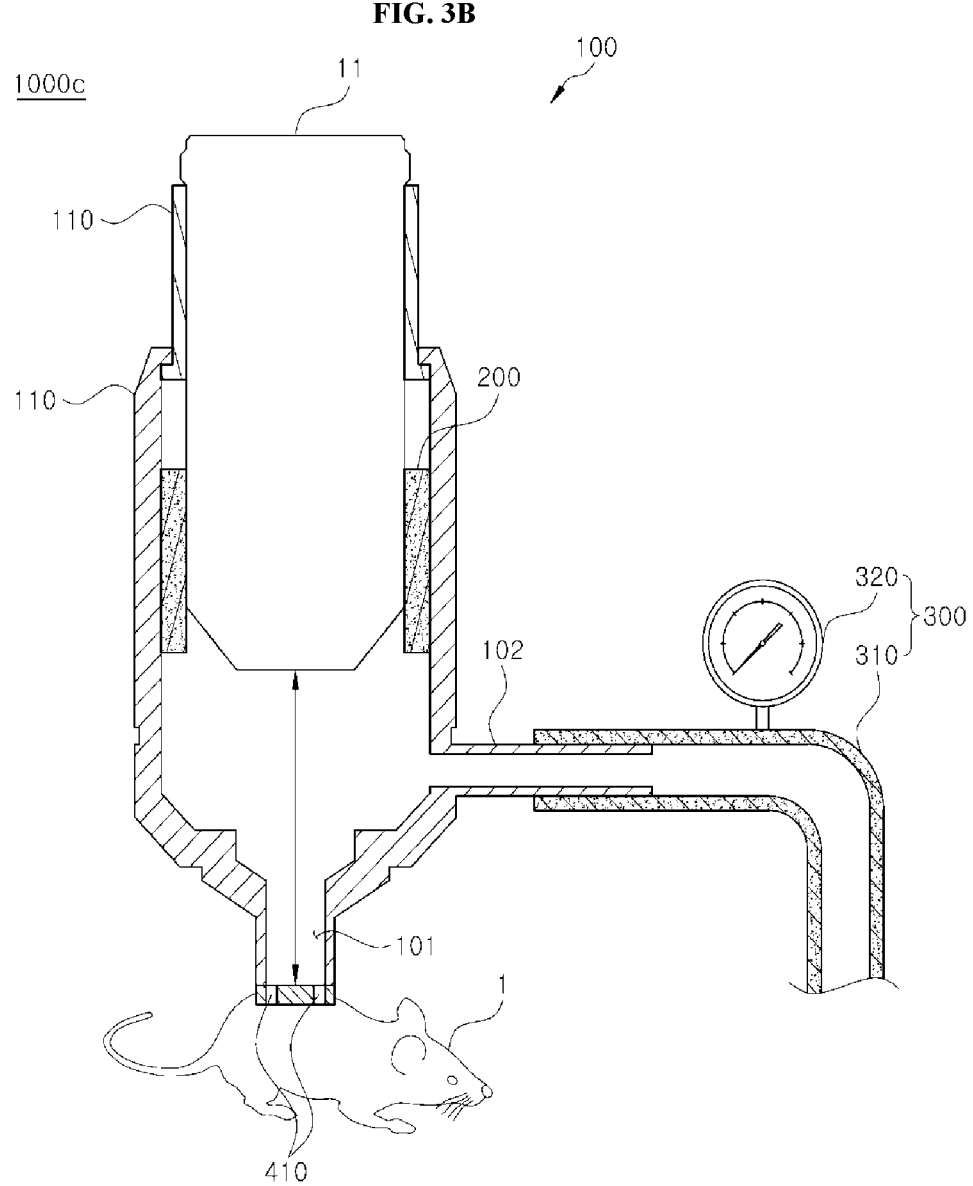

FIGS. 3A and 3B are cross-sectional views illustrating the suction type stabilizer for a lens according to the third embodiment of the inventive concept.

As illustrated in FIGS. 3A and 3B, the suction type stabilizer 1000c for a lens according to the third embodiment of the inventive concept may have a plurality of unit mounts 110, differently from the first embodiment of the inventive concept.

The plurality of unit mounts 110 may be connected to each other to be introduced and extracted in multiple stages, along a direction, in which the working distance of the lens 11 is adjusted. Then, the lens 11 may be coupled to, among the plurality of unit mounts 110, the unit mount 110 that is located on the innermost side.

Accordingly, according to the present embodiment, the working distance of the lens 11 may be adjusted by introducing and extracting the plurality of unit mounts 110 in the direction, in which the working distance of the lens 11 is adjusted.

As a result, because it is not necessary to manufacture the probe mount 100 in a customized form according to the working distance of the lens 11, the probe mount 100 may have a compatibility with the lens 11.

Figure 4:
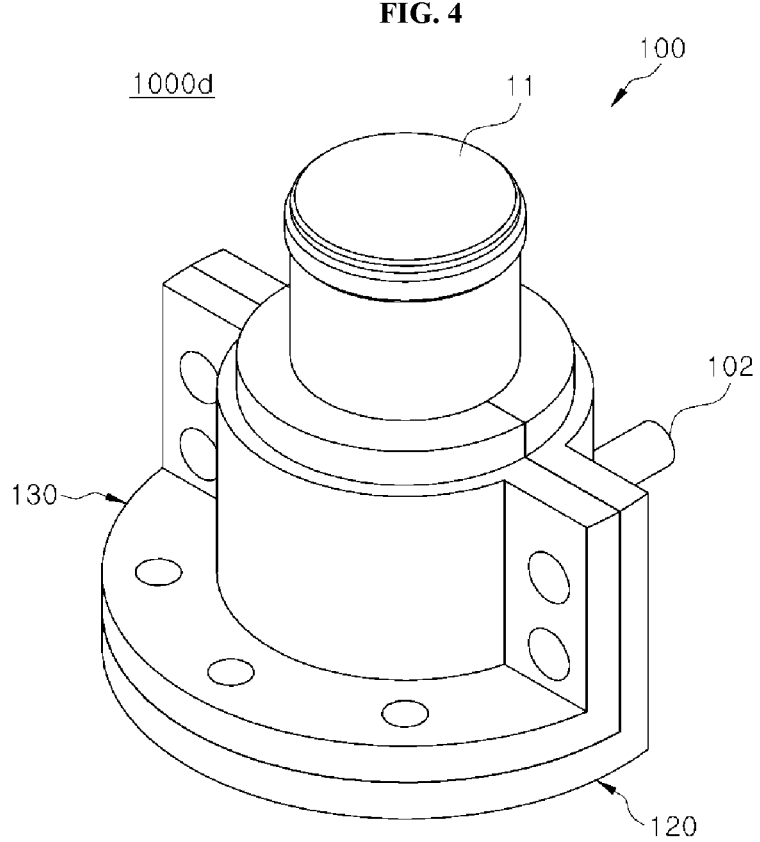
FIG. 4 is a perspective view illustrating a suction type stabilizer for a lens according to a fourth embodiment of the inventive concept.
Figure 5:
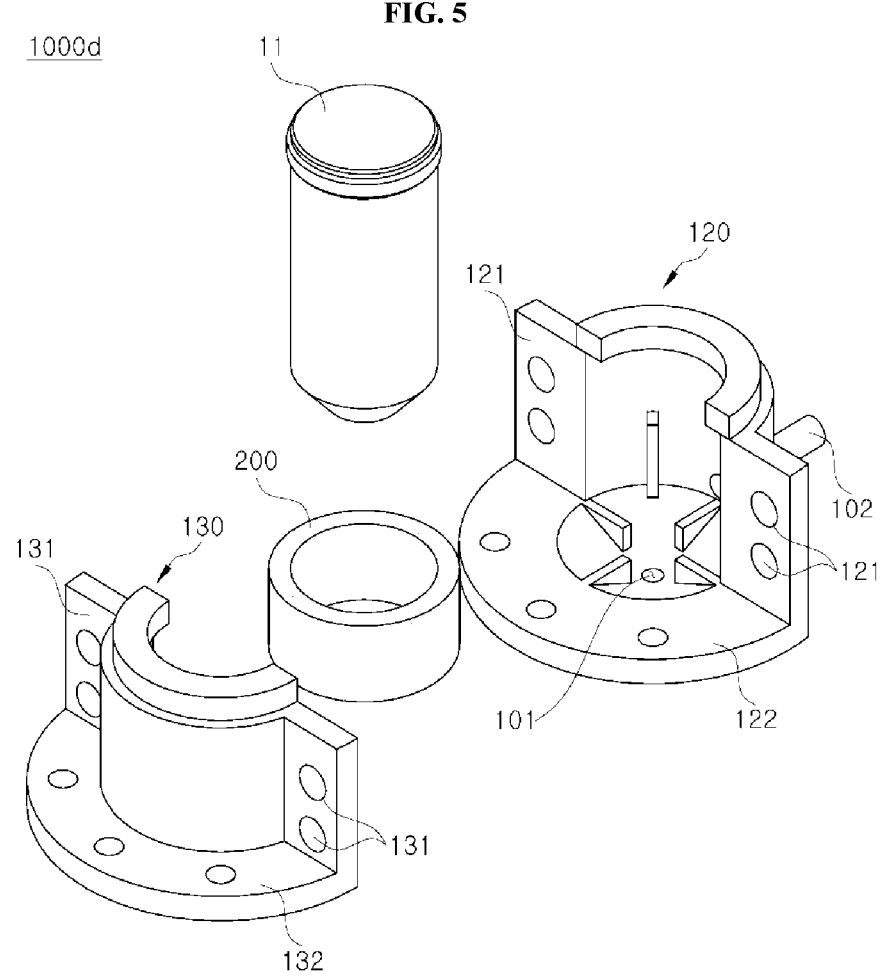
FIG. 5 is an exploded perspective view illustrating a suction type stabilizer for a lens according to the fourth embodiment of the inventive concept.
Figure 6:
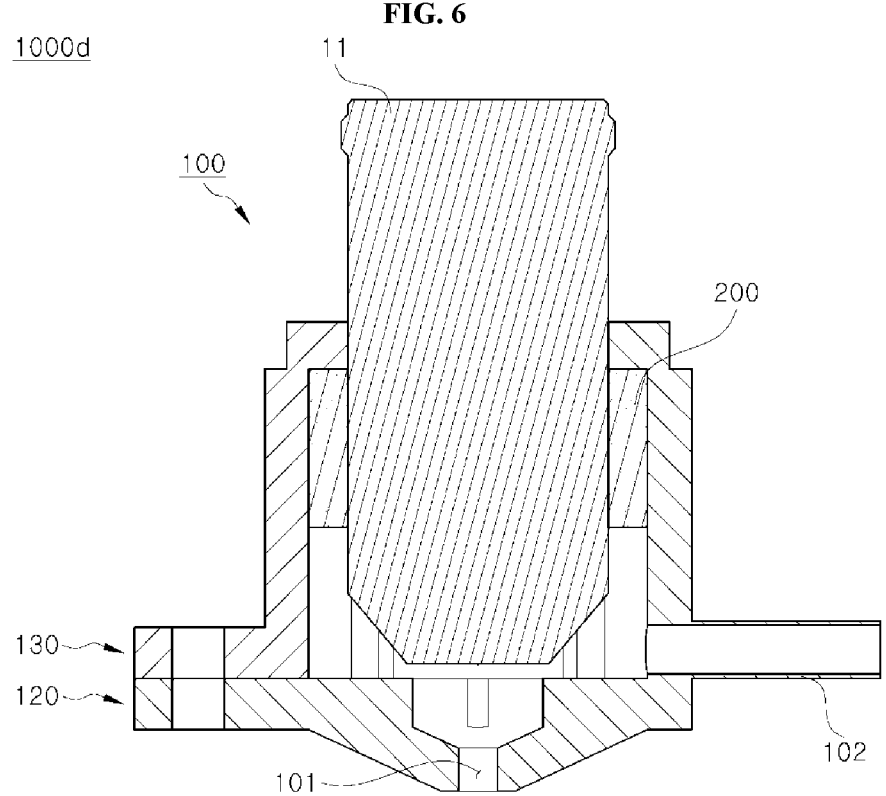
FIG. 6 is a cross-sectional view illustrating a suction type stabilizer for a lens according to the fourth embodiment of the inventive concept.

FIG. 4 is a perspective view illustrating a suction type stabilizer for a lens according to a fourth embodiment of the inventive concept. FIG. 5 is an exploded perspective view illustrating the suction type stabilizer for a lens according to the fourth embodiment of the inventive concept. FIG. 6 is a cross-sectional view illustrating the suction type stabilizer for a lens according to the fourth embodiment of the inventive concept.

As illustrated in FIGS. 4 to 6, differently from the first embodiment, according to a suction type stabilizer 1000d for a lens according to the fourth embodiment of the inventive concept, the probe mount 100 may be divided into a first mount body 120 and a second mount body 130 with respect to a lengthwise direction of the lens 11. The first mount body 120 and the second mount body 130 may be coupled to each other to be separable through a coupling member (not illustrated).

The first mount body 120 may have a first bracket. The first bracket may have a first panel 121 that extends in an outwardly radial direction along a lengthwise direction of the first mount body 120, and a second panel 122 that extends from a bottom surface of the first mount body 120 toward the second mount body 130. Here, a pair of first panels 121 may be provided.

The second mount body 130 may have a second bracket. The second bracket may have a third panel 131 that extends from the second mount body 130 in a centrifugal direction and extend to be coupled to the first panel 121 to be separable, and a fourth panel 132 that extends from a bottom surface of the second mount body 130 to be coupled to the second panel 122 to be separable. Here, a pair of third panels 131 may be provided.

The coupling member may be a screw, and the coupling member may screw-couple the first panel 121 of the first bracket and the third panel 131 of the second bracket to be separable, and may screw-couple the second panel 122 of the first bracket and the fourth panel 132 of the second bracket to be separable.

Accordingly, the user may be conveniently installed the lens 11 between the first mount body 120 and the second mount body 130 in a scheme of coupling the first bracket and the second bracket to be separable by the coupling member, in a state, which the lens 11 is disposed between the first mount body 120 and the second mount body 130.

Figure 7:
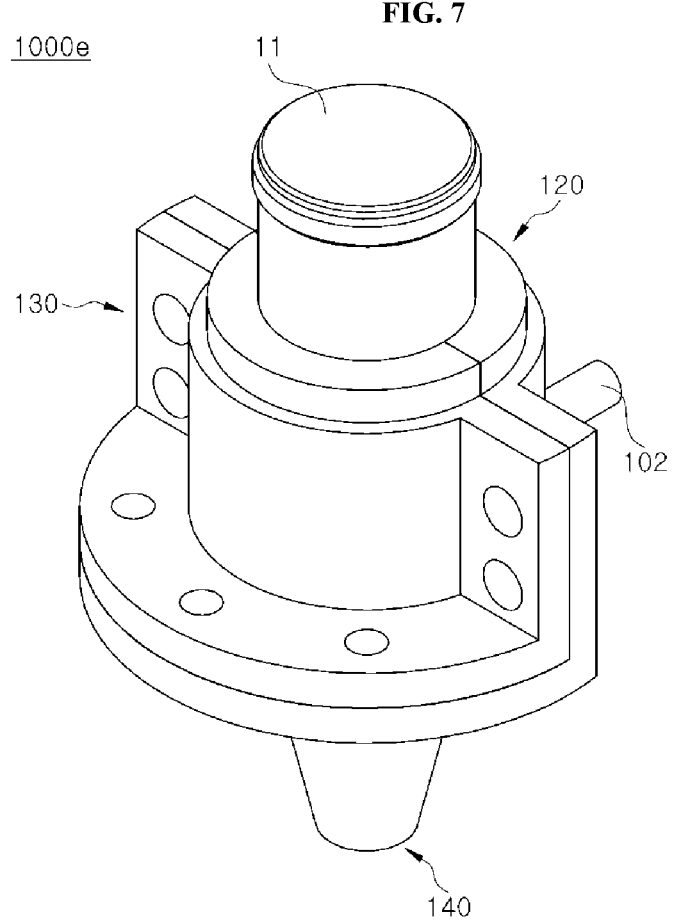
FIG. 7 is a perspective view illustrating a suction type stabilizer for a lens according to a fifth embodiment of the inventive concept.
Figure 8:
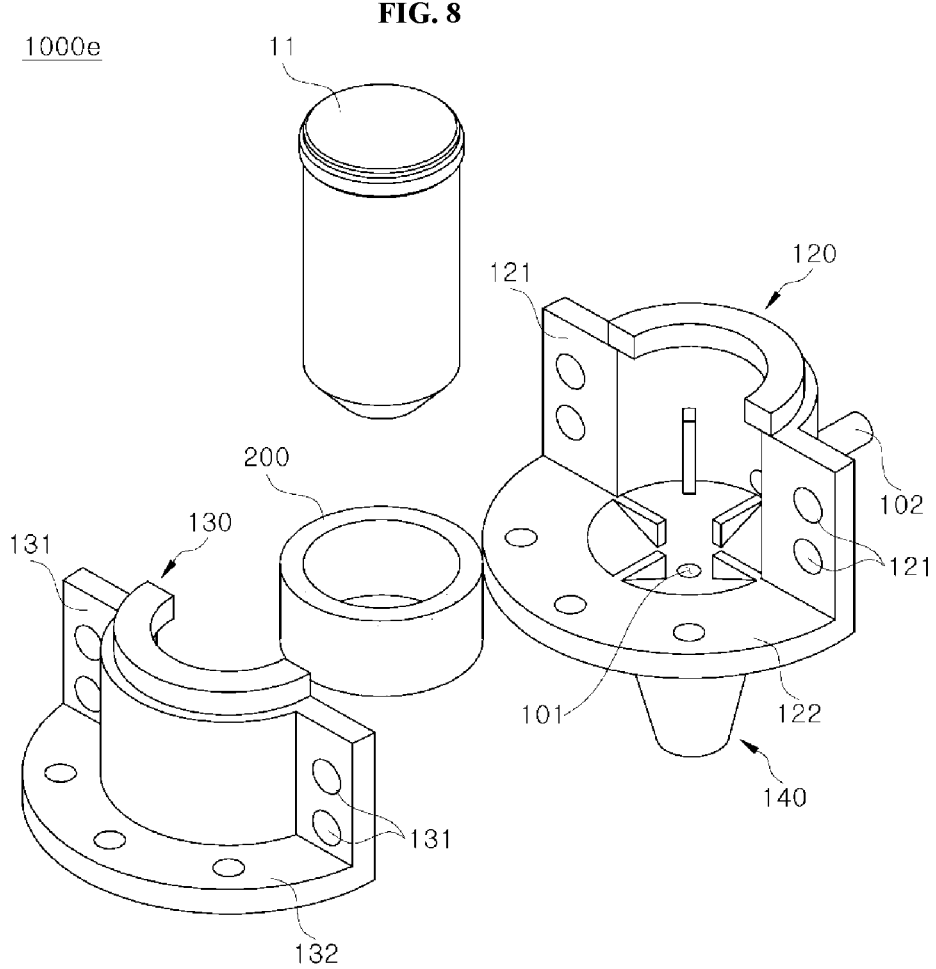
FIG. 8 is an exploded perspective view illustrating a suction type stabilizer for a lens according to the fifth embodiment of the inventive concept.
Figure 9:
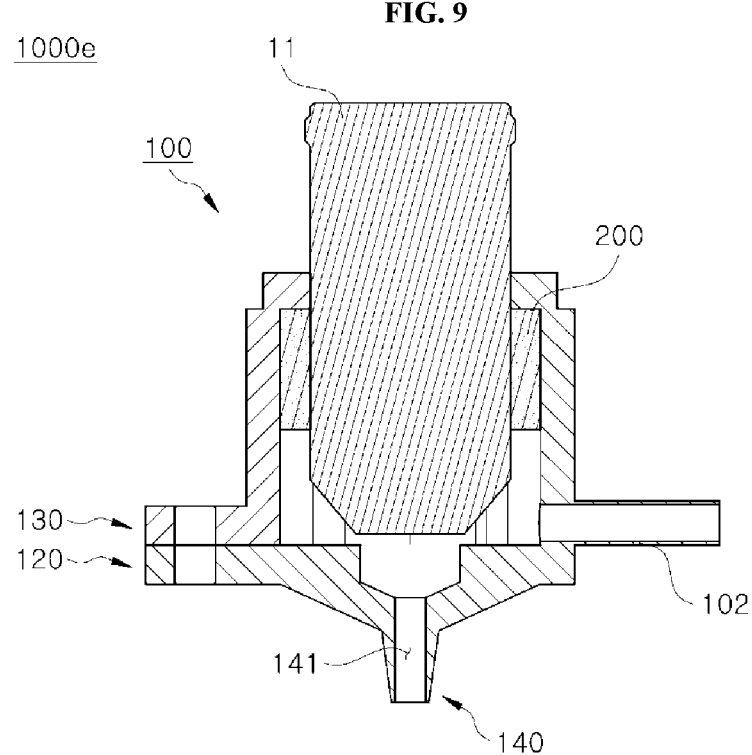
FIG. 9 is a cross-sectional view illustrating a suction type stabilizer for a lens according to the fifth embodiment of the inventive concept.

FIG. 7 is a perspective view illustrating the suction type stabilizer for a lens according to a fifth embodiment of the inventive concept. FIG. 8 is an exploded perspective view illustrating the suction type stabilizer for a lens according to the fifth embodiment of the inventive concept. FIG. 9 is a cross-sectional view illustrating the suction type stabilizer for a lens according to the fifth embodiment of the inventive concept.

As illustrated in FIGS. 7 to 9, differently from the fourth embodiment, according to a suction type stabilizer 1000e for a lens according to the fifth embodiment of the inventive concept, a working distance extending part 140 may be formed in the probe mount 100.

The working distance extending part 140 extends from the opening 101 toward the specimen 1 to extend the working distance of the lens 11. Accordingly, when the lens 11 having a relatively larger working distance is disposed in the probe mount 100, the working distance of the lens 11 may be extended through the working distance extending part 140.

Meanwhile, a communication channel 141 communicated with the opening 101 may be formed in the working distance extending part 140, and the communication panel may be provided with the press member as in the above-described second embodiment although not illustrated.

Furthermore, the working distance extending part 140 may have a form, in which a diameter thereof gradually decreases toward the specimen 1. Accordingly, the working distance extending part 140 may be easily inserted into cut tissues even through cutting of tissues of the specimen 1 of a minimum invasion like the endoscope, and thus an image of the cut tissues of the specimen may be easily acquired and observed.

Figure 10:
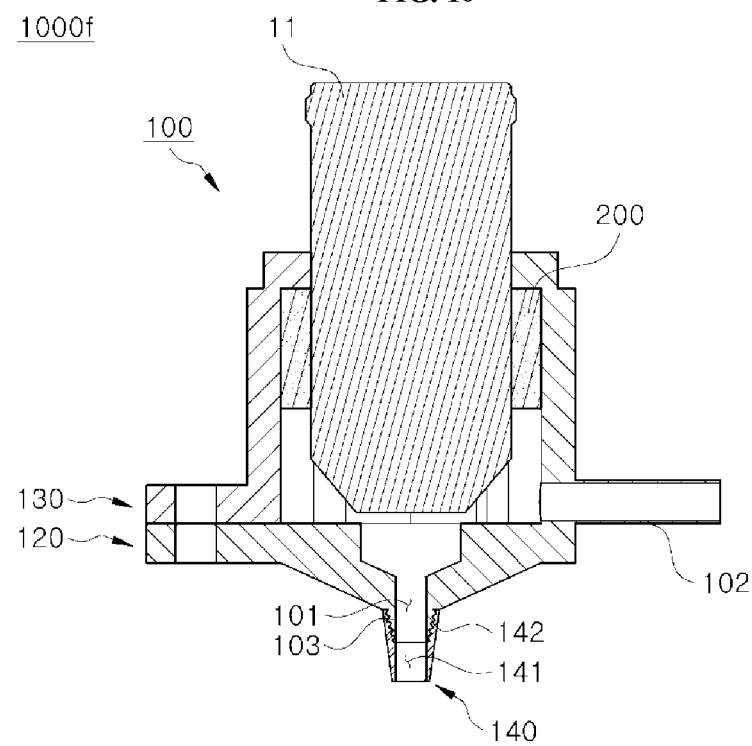
FIG. 10 is a cross-sectional view illustrating a suction type stabilizer for a lens according to a sixth embodiment of the inventive concept.

FIG. 10 is a cross-sectional view illustrating a suction type stabilizer for a lens according to the sixth embodiment of the inventive concept.

As illustrated in FIGS to 10, differently from the fifth embodiment, according to a suction type stabilizer 1000f for a lens according to the sixth embodiment of the inventive concept, a working distance extending part 140 may be formed in the probe mount 100.

In detail, a first screw thread 103 may be formed on a surface of the probe mount 100, which faces the specimen, a second screw thread 142 may be formed on a surface of the working distance extending part 140, which faces the probe mount, and the first screw thread 103 may be screw-coupled to the second screw thread 142.

FIG. 10 illustrates an example, in which the first screw thread 103 has a male screw form and the second screw thread 142 has a female screw form, but the inventive concept is not limited thereto, and the first screw thread 103 may have a female screw form and the second screw thread 142 may have a male screw form.

Figure 11:
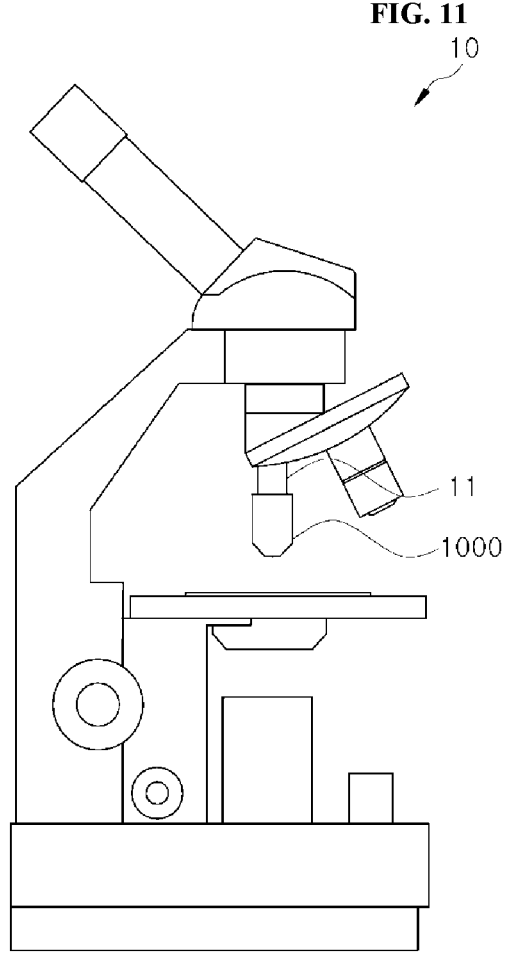
FIG. 11 is a perspective view illustrating a medical microscope, to which a suction type stabilizer for a lens according to the inventive concept is applied.

FIG. 11 is a perspective view illustrating a medical microscope, to which the suction type stabilizer for a lens according to the inventive concept is applied.

As illustrated in FIG. 11, a medical microscope 10 according to the inventive concept may include the lens 11, a display (not illustrated), and a suction type stabilizer 1000 for a lens.

The lens 11 is a site, at which an enlarged image of the specimen 1 is formed. Here, the specimen 1 may be a living body. Accordingly, when the specimen 1 is shaken, a screen quality of an image of the specimen 1, which is formed in the lens 11, may be degraded by the shaking of the specimen 1. The shaking of the specimen 1 may be caused by heart rates of the heart or expansion and contraction of the pleura of the specimen 1.

The display (not illustrated) displays the image formed in the lens 11.

The suction type stabilizer 1000 for a lens functions to fix the specimen 1 by suctioning the air in the division space formed between the lens 11 and the specimen 1, and to restrict the shaking of the specimen 1. Accordingly, because the specimen 1 is fixed by the suction type stabilizer 1000 for a lens and shaking of the specimen 1 is restricted, a screen quality of the image of the specimen 1 that is formed in the lens 11 may be prevented from being degraded, and the user who identified the display may make an accurate diagnosis in clinics.

Meanwhile, the medical microscope 10 in the present embodiment may be various microscopes, such as confocal microscopes, multiphoton microscopes, and bright field/ambient field microscopes possessed by laboratories, biopsy laboratories, and the like.

Although not illustrated, the medical endoscope according to an embodiment of the inventive concept may have the lens 11 provided with the suction type stabilizer 1000 for a lens. Accordingly, when an image of the tissues in the interior of the specimen 1 is acquired by using the medical endoscope according to an embodiment of the inventive concept, the tissues in the interior of the specimen 1 may be fixed through the suction type stabilizer 1000 for a lens.

In addition, the injection type stabilizer for a lens according to an embodiment of the inventive concept can be commonly applied to a lens of a high-resolution imaging system, a lens of a commercial microscope (e.g., a confocal fluorescence microscope and the like), a lens of a super resolution/high resolution microscope system (for example, a super resolution microscope and the like), and a lens of a biological microscope system.

Figure 12:
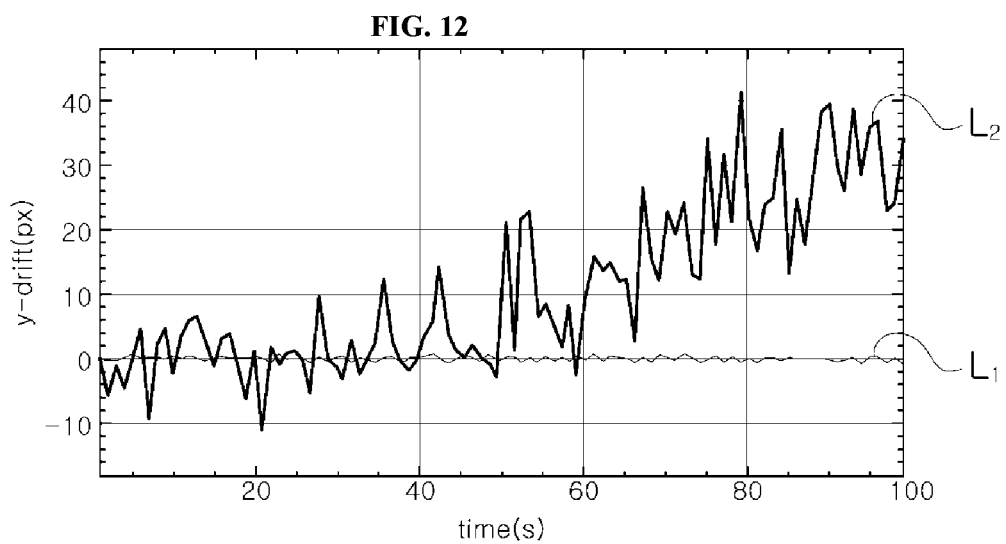
FIG. 12 is a graph depicting displacements of pixels of an image acquired from a specimen fixed to a suction type stabilizer for a lens according to an embodiment of the inventive concept and displacements of pixels of an image acquired from a specimen fixed to a lens of an existing microscope.

FIG. 12 is a graph depicting displacements of pixels of an image acquired from a specimen fixed to the suction type stabilizer for a lens according to an embodiment of the inventive concept and displacements of pixels of an image acquired from a specimen fixed to a lens of an existing microscope.

As illustrated in FIG. 12, it may be identified that a change in a displacement L1 of pixels of an image acquired from the specimen 1 fixed to the suction type stabilizer for a lens according to an embodiment of the inventive concept is relatively small.

Meanwhile, it may be identified that a change in a displacement L2 of pixels of an image acquired from the specimen 1 fixed to the lens 11 of an existing microscope, on which the suction type stabilizer as in the inventive concept is not mounted, is relatively small.

According to the inventive concept, the suction type stabilizer for a lens according to an embodiment of the inventive concept, and the medical microscope and the medical endoscope including the same may acquire a high resolution image from a specimen as the specimen is fixed and thus shaking of the specimen is restricted, and a user who identified a screen of the display may accurately perform a diagnosis in clinics.

Furthermore, the suction type stabilizer for a lens according to an embodiment of the inventive concept, and the medical microscope and the medical endoscope including the same may acquire a cellular resolution image from a specimen, and may acquire an image of an organ (for example, a nucleus, a ribosome, mitochondria, and the like).

The suction type stabilizer for a lens according to an embodiment of the inventive concept, and the medical microscope and the medical endoscope including the same may acquire a high resolution image from a specimen as the specimen is fixed and thus shaking of the specimen is restricted, and a user who identified a screen of the display may accurately perform a diagnosis in clinics.

Furthermore, the suction type stabilizer for a lens according to an embodiment of the inventive concept, and the medical microscope and the medical endoscope including the same may acquire a cellular resolution image from a specimen, and may acquire an image of an organ.

Furthermore, the suction type stabilizer for a lens according to an embodiment of the inventive concept may be provided with the press member in the opening of the probe mount and tissues of the specimen may be attached to the press member in a flat state, and thus the tissues of the specimen may be acquired as an image in a flat state in the lens and an identification performance of lesions of the tissues of the specimen acquired from the image may be enhanced.

Furthermore, the probe mount of the suction type stabilizer for a lens according to an embodiment of the inventive concept may include the plurality of unit mounts, and the working distance of the lens may be adjusted by introducing and extracting the plurality of unit mounts in the direction, in which the working distance of the lens is adjusted. Accordingly, it is not necessary to manufacture the probe mount in a customized form according to the working distance of the lens, and the probe mount may be compatible with the lens.

Furthermore, according to the suction type stabilizer for a lens according to an embodiment of the inventive concept, the probe mount may be divided into the first mount body and the second mount body with respect to a lengthwise direction of the lens, and the lens may be conveniently installed between the first mount body and the second mount body in a scheme of coupling the first bracket and the second bracket to be separable by the coupling member in a state in which the lens is disposed between the first mount body and the second mount body.

Furthermore, according the suction type stabilizer for a lens according to an embodiment of the inventive concept, the working distance extending part, a diameter of which gradually decrease toward the specimen, may be provided in the probe mount, and an image of the cut tissues of the specimen may be conveniently acquired by conveniently inserting the working distance extending part of the probe mount into the cut tissues of the specimen.

The effects of the inventive concept are not limited to the above-mentioned ones, and the other unmentioned effects will become apparent to those skilled from the art from the following description.

Although the exemplary embodiments of the inventive concept have been described with reference to the accompanying drawings, it will be understood by those skilled in the art to which the inventive concept pertains that the inventive concept can be carried out in other detailed forms without changing the technical spirits and essential features thereof. Therefore, the above-described embodiments are exemplary in all aspects, and should be construed not to be restrictive.

What is claimed is:

1. A suction type stabilizer for a lens, comprising:
   a probe mount, in which a lens is disposed in an interior thereof and an opening that contacts a specimen is formed on one side thereof;
   an elastic body interposed between the lens and the probe mount, configured to elastically support the lens, and defining a division space between the lens and the opening; and
   a negative pressure forming part forming a negative pressure while suctioning air accommodated in the division space and attaching and fixing the specimen to the opening
   wherein the probe mount further includes:
   a plurality of unit mounts connected to each other to be introduced and extracted in multiple stages along a direction, in which a working distance of the lens is adjusted.

2. The suction type stabilizer of claim 1, further comprising:
   a press member provided in the opening and configured to press tissues of the specimen,
   wherein a suction hole is formed in the press member, and
   wherein the tissues of the specimen that is to be observed are attached to the press member in a flat state when the negative pressure is formed in the division space and the suction hole by the negative pressure forming part.

3. The suction type stabilizer of claim 2, wherein a plurality of suction holes are provided, and
   wherein the plurality of suction holes are arranged along a circumferential direction of the press member.

4. The suction type stabilizer of claim 1, wherein the probe mount further includes:
   a working distance extending part extending from the opening toward the specimen to extend a working distance of the lens, and
   wherein a communication channel communicated with the opening is formed in the working distance extending part.

5. The suction type stabilizer of claim 4, wherein an outer peripheral surface of the working distance extending part has a shape, a diameter of which gradually decreases toward the specimen.

6. The suction type stabilizer of claim 1, wherein the probe mount further includes:
   a working distance extending part coupled to the opening to be separable and configured to extend a working distance of the lens, and
   wherein a communication channel communicated with the opening is formed in the working distance extending part.

7. The suction type stabilizer of claim 1, wherein the probe mount is divided into a first mount body provided with a first bracket and a second mount body provided with a second bracket with respect to a lengthwise direction of the lens, and wherein the probe mount has a coupling member coupling the first bracket and the second bracket.

8. The suction type stabilizer of claim 1, wherein one side of the probe mount, which faces the specimen, has a shape, a diameter of which gradually decreases toward the specimen.

9. A medical microscope including the suction type stabilizer for the lens of claim 1.

10. A medical endoscope including the suction type stabilizer for the lens of claim 1.

* * * * *